US011044206B2

United States Patent
Ward et al.

(10) Patent No.: US 11,044,206 B2
(45) Date of Patent: Jun. 22, 2021

(54) LIVE VIDEO ANOMALY DETECTION

(71) Applicant: International Business Machines Corporation, Armonk, NY (US)

(72) Inventors: Brett Ward, Clayton, NC (US); Mark Delaney, Raleigh, NC (US); Al Chakra, Apex, NC (US); Robert H. Grant, Atlanta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 35 days.

(21) Appl. No.: 15/957,958

(22) Filed: Apr. 20, 2018

(65) Prior Publication Data

US 2019/0327183 A1    Oct. 24, 2019

(51) Int. Cl.
| | | |
|---|---|---|
| *H04L 12/927* | (2013.01) | |
| *H04L 29/08* | (2006.01) | |
| *H04L 12/911* | (2013.01) | |
| *G06K 9/00* | (2006.01) | |

(52) U.S. Cl.
CPC ............ *H04L 47/80* (2013.01); *H04L 47/822* (2013.01); *H04L 67/22* (2013.01); *G06K 9/00718* (2013.01)

(58) Field of Classification Search
CPC ........ H04L 47/80; H04L 47/822; H04L 67/22
USPC ........................................................ 709/204
See application file for complete search history.

(56) References Cited

U.S. PATENT DOCUMENTS

| | | | |
|---|---|---|---|
| 9,071,367 B2 | 6/2015 | Abhyanker et al. | |
| 9,820,120 B2 | 11/2017 | Decharms | |
| 2003/0105865 A1* | 6/2003 | McCanne | H04L 12/18 709/225 |
| 2011/0106736 A1* | 5/2011 | Aharonson | G06Q 10/109 706/12 |
| 2011/0244440 A1* | 10/2011 | Saxon | G06F 9/5027 434/362 |
| 2011/0246908 A1* | 10/2011 | Akram | H04N 21/234318 715/752 |
| 2013/0005294 A1 | 1/2013 | Levinson et al. | |
| 2014/0118123 A1* | 5/2014 | Lim | G08C 17/00 340/12.53 |
| 2015/0070516 A1* | 3/2015 | Shoemake | H04N 21/42203 348/207.11 |
| 2015/0208000 A1* | 7/2015 | Ojanpera | H04N 21/8549 386/278 |
| 2015/0363694 A1 | 12/2015 | Banerjee et al. | |

(Continued)

OTHER PUBLICATIONS

Peter Mell et al., "The NIST Definition of Cloud Computing", NIST, Special Publication 800-145, Sep. 2011, 7 pages.

*Primary Examiner* — Meng Vang
(74) *Attorney, Agent, or Firm* — Cantor Colburn LLP; Tihon Poltavets

(57) ABSTRACT

Embodiments of the invention include computer-implemented methods, computer program products and systems for live video anomaly detection. The embodiments include detecting live stream data, determining an activity from the live stream data, and receiving contextual data associated with the live stream data. The embodiments also include prompting a user to redirect the live stream data from a first channel based on the activity and the contextual data, and redirecting, responsive to the prompt, the live stream data to a different channel and simultaneously maintaining the live stream data on the first channel.

14 Claims, 8 Drawing Sheets

(56) References Cited

U.S. PATENT DOCUMENTS

2016/0112760 A1* 4/2016 Kosseifi .......... H04N 21/42203
                                                        725/28
2018/0063253 A1* 3/2018 Hellkvist ......... H04N 21/21805

* cited by examiner

| Previous Occurrence | Emotion | Facial Recognition Relevance | Audio Sentiment | Situational Analysis | Event Tolerance | Response | Severity |
|---|---|---|---|---|---|---|---|
| Person falls off roof | 0.8 | 0.7 | 0.74 | 0.8 | 0 | Called 911 | Highest |
| Child chokes on food | 0.5 | 0.6 | 0.9 | 0.9 | 0.1 | Called 911 | Highest |
| Child falls and breaks arm | 0.7 | 0.9 | 0.8 | 0.6 | 0.3 | Notify High ICE | High |
| Live cooking, person slices hand | 0.5 | 0.8 | 0.6 | 0.5 | 0.5 | Notify Med ICE | Medium |
| Wrestling event, person falls | 0.9 | 0.4 | 0.4 | 0.1 | 0.9 | None | None |

| Event | Location | Date/Time | Context Indicator | Detection Method | Anomaly Indicator | Contextual Recognition |
|---|---|---|---|---|---|---|
| Gunshot | Frank's Gun Park | 11/2/17 14:52 | Gunshots<br>Happy facial expression<br>Heart rate 85 BPM | Microphone<br>Camera<br>Smartwatch | 7<br>1<br>2 | Leisure activity |
| Scream | Home | 11/3/17 6:42 | Crying<br>Hearty rate 70 BPM<br>Just waking up<br>Baby hungry – food retrieval | Baby monitor<br>Smartwatch<br><br>Smartwatch<br>Refrigerator | 6<br>3<br>1<br>1<br>2 | Child care |
| Yelling | The Ritz – Concert Venue | 11/22/17 0:51 | Shouting<br>Aggression – tone analysis<br>Violent behavior – language<br>Aggression – facial recognition<br>Panic | Microphone<br>Microphone<br><br>Microphone<br><br>camera<br><br>Smartwatch | 8<br>9<br>7<br>7<br>8 | Violence |
| Car Crash | Home | 11/21/17 20:00 | Car Crash<br>Movie on SPEED<br>Audial level<br>Car crash –movie scene<br>Heart rate 70 BPM – calm | Microphone<br>Smart TV<br>Surround sound<br><br>Smartwatch | 7<br>6<br>7<br>5<br>1<br>1 | Leisure activity |

FIG. 6

LIVE VIDEO ANOMALY DETECTION

BACKGROUND

The present invention generally relates to computer systems, and more specifically, to live video anomaly detection.

Recording and video capturing devices are widely available and are part of our everyday lives. There are many applications that support live streaming and video chat sessions where various type of information can be exchanged. These applications are useful in both personal settings when communicating with family members who live a distance away using tablets and/or mobile phones and are also useful in business enterprise settings when conducting meetings with international partners in conference rooms equipped with webcams or other image/video capturing devices. Live streaming video capability has enhanced the daily lives of its users by providing convenience and efficient exchange of information.

SUMMARY

Embodiments of the present invention are directed to computer-implemented methods, computer program products and systems for live video anomaly detection. The embodiments include detecting live stream data, determining an activity from the live stream data, and receiving contextual data associated with the live stream data. The embodiments also include prompting a user to redirect the live stream data from a first channel based on the activity and the contextual data, and redirecting, responsive to the prompt, the live stream data to a different channel and simultaneously maintaining the live stream data on the first channel.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5 depicts a user specific profile for live video anomaly detection;

FIG. 6 depicts an anomaly indicator table used for live video anomaly detection;

Figure 1:
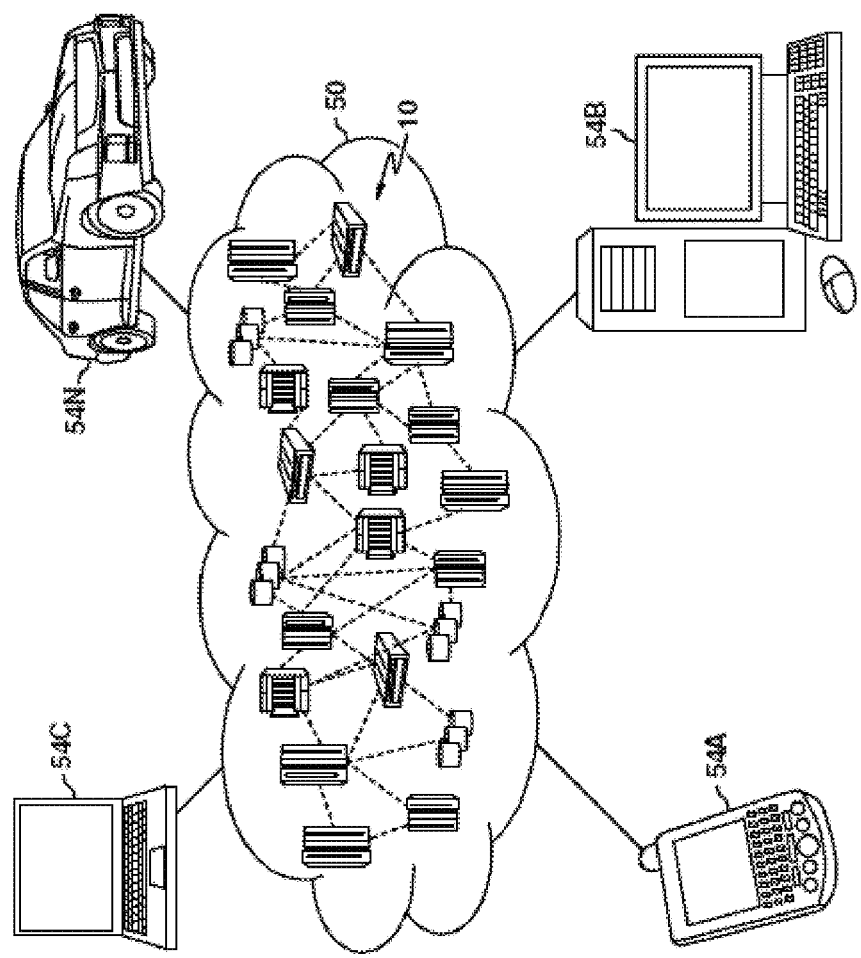
FIG. 1 depicts a cloud computing environment according to an embodiment of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
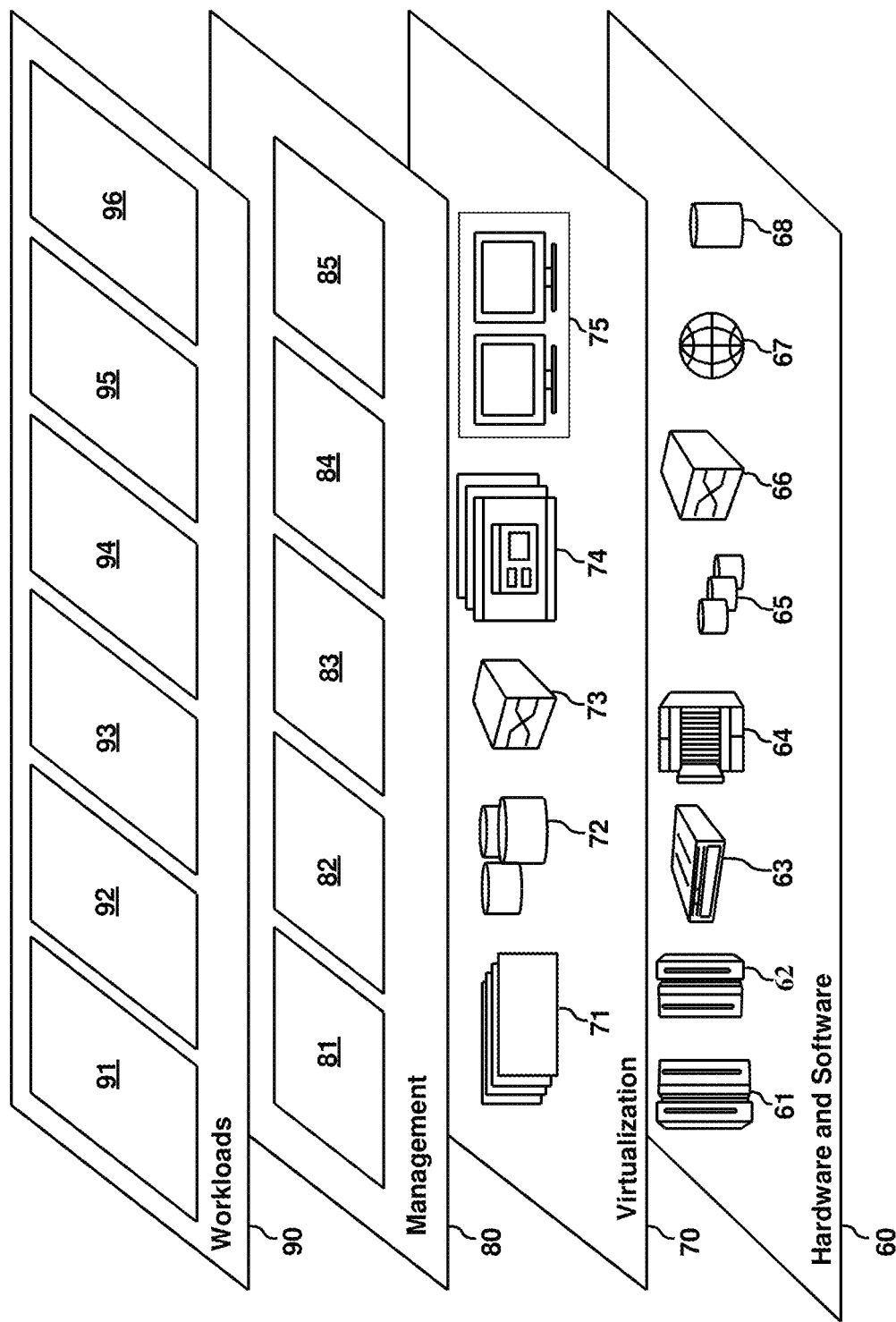
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

Figure 3:
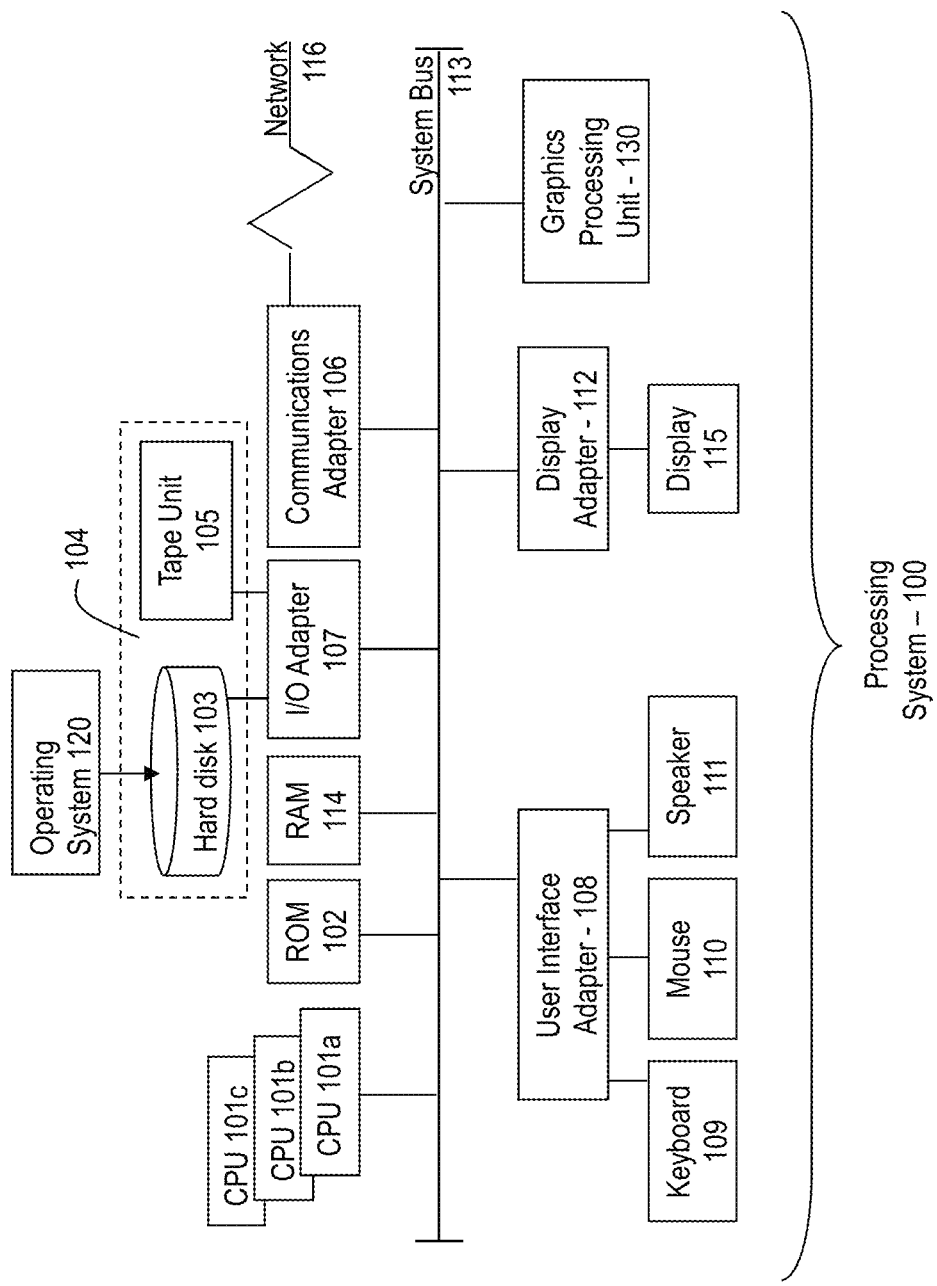
FIG. 3 depicts a system for practicing the teachings provided herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

In today's environment, user devices are equipped with video capturing abilities and these devices as well as other monitoring/video capturing systems are present in our daily lives. Various applications can support live streaming. However, applications do not support live streaming and redirecting the current live stream to an external system unrelated to the live streaming application. For example, when a user is recording and live streaming an emergency situation where appropriate authorities should get involved, users are faced with the dilemma of either continuing the live feed or stopping the live feed to dispatch the proper respondents to the emergency situation being captured. Currently, only after the footage is recorded can the proper individuals such as the police, journalists, lobbyists, etc.

In one or more embodiments of the invention, the techniques described herein provide users the ability to live stream video and redirect the live stream to an unrelated external system while continuing the live stream. In addition, the techniques also include the ability to dynamically recognize anomalies within the live stream relative to a specific user filming the live stream. Based on the user's sensitivities and the contextual information, the system can provide a prompt to redirect the live feed to an appropriate channel. The invention leverages pattern and facial recognition, contextual recognition of video, machine-learning, etc. to select a redirection channel.

Turning now to an overview of technologies that are more specifically relevant to aspects of the invention, social media platforms and applications offer live streaming capabilities. In addition, a user's social media profile can offer information related to the user's like/dislikes and preferences which can provide further information on the user's sensitivities to various events. For example, a user may post videos related to extreme sports where the user has participated in. In addition, the user's comments can be analyzed to determine whether user likes extreme sports or has no interest. Posts that a user has shared can be also be used to show a user's preference. The techniques described herein leverage social media and other publicly accessible information.

Turning now to an overview of the aspects of the invention, one or more embodiments of the invention address the above-described shortcomings of the prior art by providing the functionality to determine an anomaly occurring in a live stream and providing a prompt to redirect the live feed to the appropriate parties. In one or more embodiments of the invention facial recognition can be used to identify the individuals being filmed and this information can be leveraged to provide notifications to their important contacts.

In one or more embodiments, the invention utilizes situational training relative to the user or surrounding situations to detect anomalies of different situations. Data is collected from the emergency situations that have been captured either by the user or by other users and the responses taken.

In the event a similar event is captured during the live video stream after training, data inputs and severity are used to understand the emergency situation. Based on a one or more of the data inputs, event tolerance, detected event, and the available response channels, the appropriate channel is selected. The live stream of the emergency situation is transmitted on the appropriate channel, including the segment displaying the scenario. The user can be prompted to invoke the emergency channel or entirely bypassing the invocation based on the situation. These measurements are user specific and anomaly indicators for a specific event are not necessarily the same across different users depending on their exposure to such an event.

The above-described aspects of the invention address the shortcomings of the prior art by providing additional functionality to the user during the recording of a live stream. The live stream can be redirected to an appropriate channel and can be simultaneously maintained on the original recording device.

Figure 4:
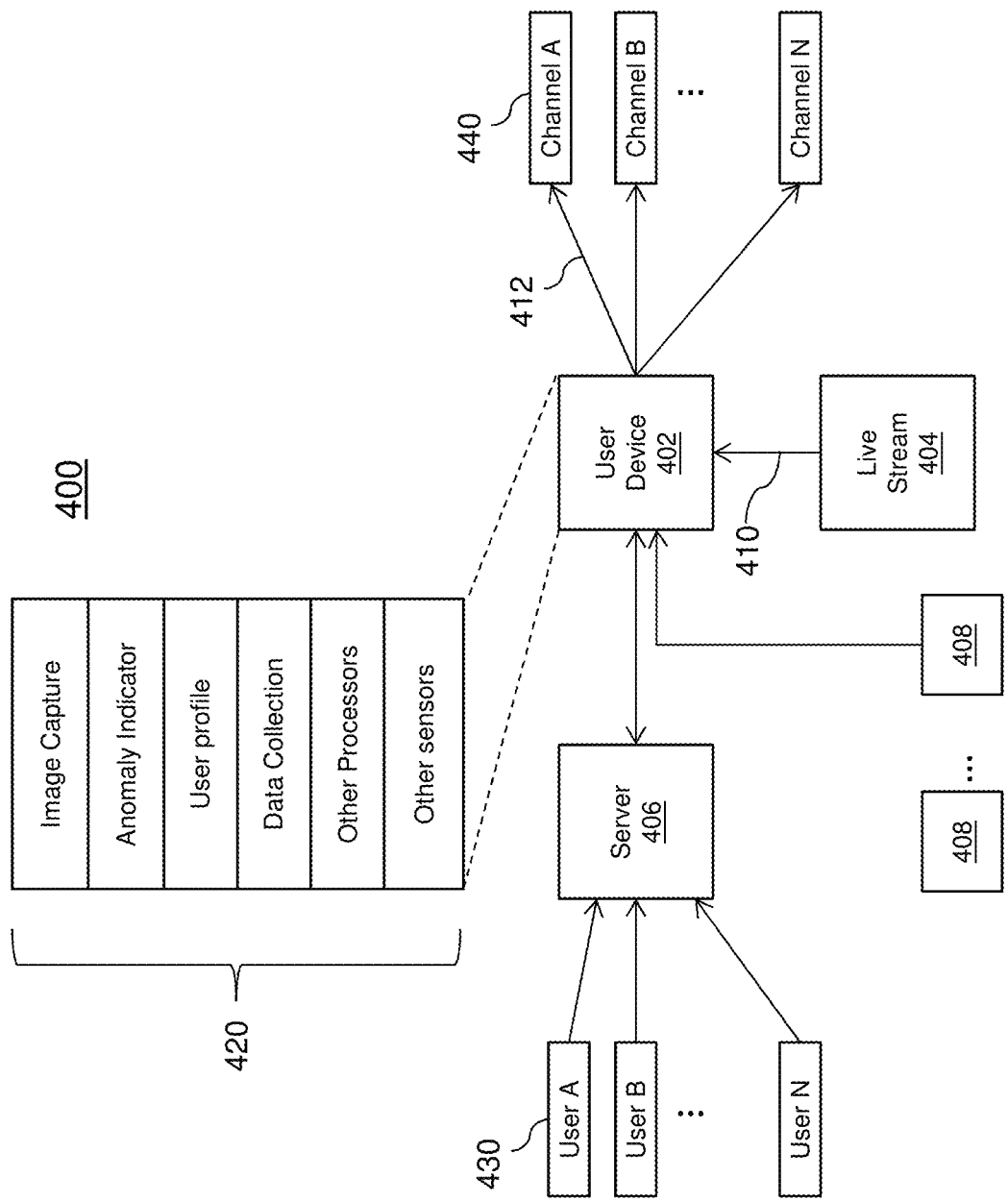
FIG. 4 depicts a system for implementing live video anomaly detection in accordance with one or more embodiments of the invention.

Turning now to a more detailed description of aspects of the present invention, FIG. 4 illustrates a block diagram of a system 400 for a live video anomaly detection system according to one or more embodiments. In the illustrative embodiment, FIG. 4 depicts a user device 402 where the user device 402 includes an image capturing device. The user device 402 includes a plurality of modules and sensors to collect data. It should be understood that other devices, processors and modules can be included in the present invention. The image/video capturing device is configured to record live stream 404 events and activities over a first channel 410. The user device 402 configured to communicate with server 406 which can also store data. The user device 402 is also configured to detect data from receive contextual data from other sensors/devices 408. Sensors/devices can include but are not limited to smartwatches, smart appliances, baby monitors, microphones, thermometers, gyroscopes and accelerometers, etc.

In addition, the server 406 is configured to process an analyze data from other users 430 such as other user profile data and factoring other users' sensitivities towards a detect activity.

In one or more embodiments, the user device 402 is configured to redirect data to one of a plurality of channels 412 to other entities/contacts 430. One channel can be provided to emergency responders, another channel can be provided for the police, and a different channel can be for designated emergency contacts configurable by the user. In one or more embodiments of the invention, the live stream anomaly detection system 400 can be determined from a frequently contacted list of the user recording the live stream. Embodiments of the invention include the system analyzing the inputs and other contextual data within proximity of the user device 402 to automatically select the appropriate redirection channel 412 to transfer the live stream and/or or recorded video to one or more the contacts 440.

In one or more embodiments of the invention, the anomaly indicator table is calculated case by case for each user/activity depending on the type of sensor collecting the information. Measurements and calculations are user specific and anomaly indicators for a specific activity are not necessarily the same across different users depending on the user's exposure to such an event.

For example, in the case of gunshots recorded in the table above the microphone can calculate/measure decibel levels, repeated patterns, distance, etc.

In one or more embodiments of the invention, a user's sensitivities and tolerance levels can be updated as their responses are recorded and change over time. Upon the detection of live stream feed, if the user's calculated tolerance has been exceeded, the live video anomaly detection system 400 can provide a prompt to the user based to redirect the live feed to the appropriate authorities.

Now referring to FIG. 5, a user specific profile 500 used in live video anomaly detection is shown. The data stored in the user specific profile 500 includes data for previous occurrences and reactions for a specific user that have been captured. Similar circumstances can lead to different outcomes for a range of users based on each respective user's determined sensitivities. The data can be detected by various techniques or input by the user.

The user specific profile 500 includes activities/events of previous occurrences. In addition, facial recognition relevance data, audio sentiment data, situational analysis data, event tolerance data, response information, and severity information is stored.

"Previous occurrence" identifies scenarios that have been previously live streamed by a user. A few non-limiting examples from the profile 500 includes capturing footage of "a person falling off the roof," "a child falls and breaks arm," and "wrestling event, person falls."

"Emotion" data indicates the emotion of the person captured in the live stream. In this example, "1" indicates an intense emotion where "0" indicates no emotion at all.

"Facial recognition relevance" to the user is detected. For example, facial expressions can be compared to that of the user to determine whether the facial expression of the live recording provides a similar facial expression as the user. For example, a happy face of a user can be compared to a happy face of a person in the live stream. The higher the correlation, the higher the value is attributed to this factor.

"Audio sentiment" provides data on the audio of the live stream. For example, the loud cheers for a wrestler can be discerned from loud aggressive language used in a street fight.

"Situational analysis" factors other contextual information related to the occurrence of an activity. For example, the system can determine a location of a person that has fallen. For example, a person falling off of a roof is different than a child falling in a playground which is also different than a wrestling falling in a wrestling match. The higher the value for the situational analysis, the stronger the contextual information supports the occurrence of a particular event.

"Event tolerance" indicates a threshold where the user recording the live stream is to be prompted for a redirection of the channel. In this non-limiting example, a "0" indicates no tolerance where the user should be prompted immediately. "1" indicates a high tolerance to the content of the live stream feed.

In one or more embodiments, the social media profile data of the user can be analyzed to determine how a particular event appeals to a person's sensitivities. For example, the sight of blood may be less of a shock to an experienced doctor compared to a young adult who is disturbed by the sight of blood.

"Responses" includes calling 911 or notifying a particular in-case of emergency contact (ICE). In addition, the "response" can include taking no action.

"Severity" indicates a level of urgency or potential harm. The severity can be determined based on a combination of the previously mentioned factors. In addition, the severity can be confirmed by the user after the occurrence. In this example, the severity is measured between indicators including highest, high, medium, low, none. In the event 911 is called, the system can automatically indicate the previous occurrence with the "highest" severity.

In one or more embodiments of the invention, anomaly indicator table 600 can be stored in the user device 402. In another embodiment, the anomaly indicator table 600 can be stored in the server such as server 406 of FIG. 4.

Now referring to FIG. 6, an anomaly indicator table 600 used in live video anomaly detection in accordance with one or more embodiments.

The anomaly indicator table 600 stores data used to determine that an anomaly is being captured by the user device 402. In one or more embodiments of the invention, the anomaly indicator table 600 can be stored in the user device 402. In another embodiment, the anomaly indicator table 600 can be stored in the server such as server 406 of FIG. 4 and accessed by the user device 402. It should be understood that other data can be used in the determination.

Continuing with reference to FIG. 6, the anomaly indicator table 600 includes event/activity data, location information, date/time information, context indicator, detection method, anomaly indicators, and contextual recognition information.

The event/activity information provides data of the live stream being captured. Event/activity information can be determined by the user device by a number of techniques. As a live video stream is captured, the location information can provide an indication. For example, Frank's Gun Park can indicate the gunshots are detected.

The anomaly indicator table 600 includes location information of the event/activity. The location can be obtained by location systems such as GPS.

The date and time information can be used provide further information about whether a certain activity is occurring at normal times are odd times. Continuing with Frank's Gun Park example, the days/hours of operation of the establishment can be obtained from an Internet search and compared to the time/date the live stream is filmed. The table 600 indicates the date is Nov. 2, 2017 at 2:52 which is during the normal hours of operation which weighs towards a normal scenario.

The context indicator provides additional data that can be collected by other devices, sensors, etc. The detectors can include cameras, microphones, smartwatches, smart devices such as smart appliances, TVs. A network of devices can be used to determine the circumstances surrounding the activity/event of the live feed being recorded. In one or more embodiments of the invention, data can be collected by a variety of sensors from nearby IoT sensors.

The analysis of the live stream at Frank's Gun Park uses facial recognition where happy facial expressions were captured in the live stream. This can indicate that there is no reason for alarm and no anomaly is detected.

The detection method indicates the device that detected the context indicator data. For example, the gunshots are detected by a microphone of a user device such as a mobile phone or smartwatch. In addition, data from the microphone can be further analyzed to calculate the decibel level, frequency of this type of event (how many times similar readings have occurred), type of gunshot via tonal/decibel analysis of readings from various weapons, rate of fire, proximity, etc. in order to determine the potential danger, harm, anomalous occurrence.

In addition, the facial expressions are captured by the video capturing device of the user device using facial recognition technology. It should be understood that other types of facial expressions can be detected such as apprehension, sadness, anxiety, etc.

The contextual recognition can provide information on the type of event/activity. The contextual recognition of a video feed and compared against calculated tolerance level for each given event type and determine if the severity/intensity of the event being captured in the live video feed exceeds the tolerance level and should trigger a response in the system. If the response/prompt is ignored, continued recognition of the event that is exceeding tolerance level will trigger a second response/prompt for user interaction. The prompt may also include an option to begin recording the feed and subsequently forwarding the feed to a necessary/desired party.

In a non-limiting example, screaming resulting from an argument in a home setting can be distinguished from yelling and cheering at a concert or show. As shown in FIG. 6 the location can be determined using sensors. In addition, the live stream video can be analyzed to determine the facial expressions of those in proximity. Facial expressions showing anger and/or panic and audio indicating shouting can be an indicator of violence. Also, the audio can be analyzed to determine the types of words that are being used. Sensors such as smartwatches including heart rate monitors can be used to detect the heart rate of the user. A normal heart rate of the user filming and witnessing the event, based on a history of the user's heart rate, can indicate that the user is filming an abnormal situation. If the event live stream is filming a concert, a schedule of the concert can be searched to confirm that a concert matching the location, venue, and time in fact exists.

In one or more embodiments of the invention, a car crash occurring in a movie can be distinguished from a car crash in a movie. For example, sensors can detect the location, context indicators can detect whether the audio profile matches a movie's audio profile. In addition, sensors such as smartwatches can detect the heart rate of the user to be factored in the determination.

Figure 7:
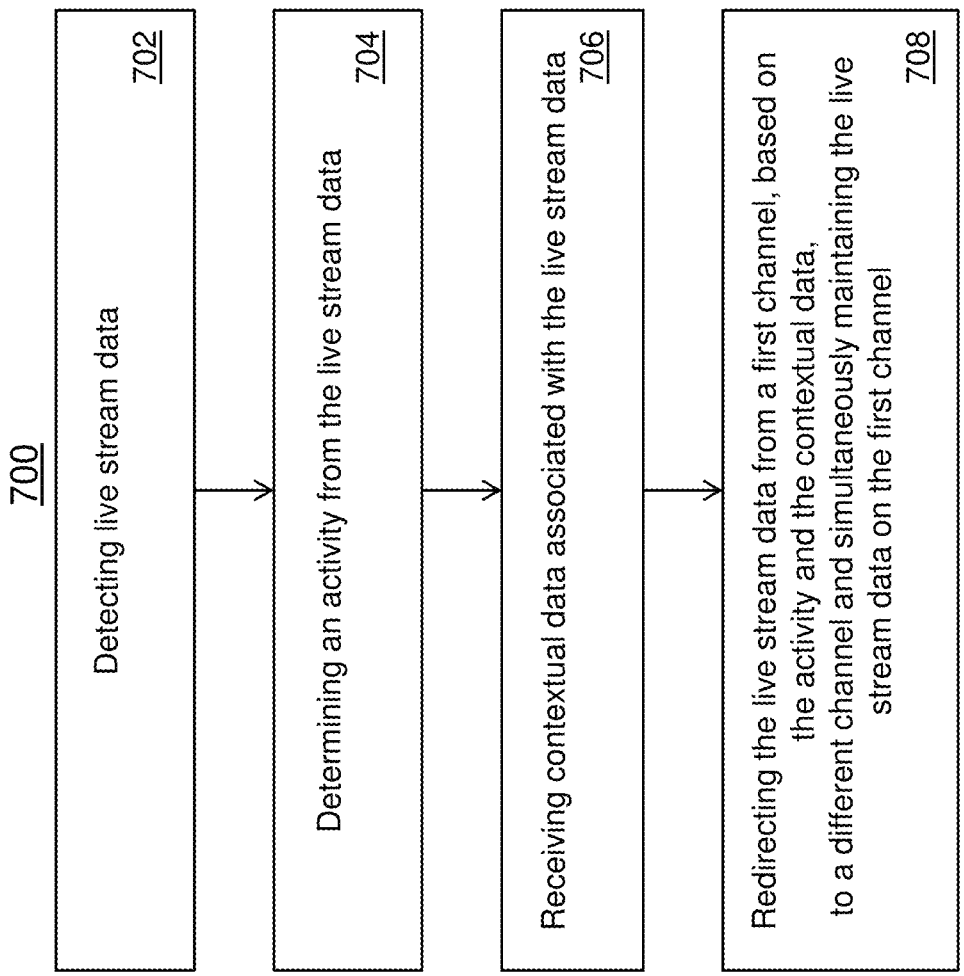
FIG. 7 depicts a flowchart for performing live video anomaly detection.

Now referring to FIG. 7, a flowchart 700 for live video anomaly detection is shown. Block 702 includes detecting live stream data. In one or more embodiments of the invention, the live stream data/feed is recorded using a user device such as a mobile phone, tablet, computer, and the like having video capturing capability.

Block 704 includes determining an activity from the live stream data. The system analyzes the live stream data to determine an activity being conducted in the live stream.

Next, as shown at block 706, the method 700 includes receiving contextual data associated with the live stream data. In one or more embodiments of the invention, the contextual data can include data provided from one or more sensors of the device or one or more external devices such as smart devices and smart appliances. For example, location data can be used to determine a venue such as movie theatre or park. The location data can be used to determine whether the user is hearing gunshots at a shooting range or an action film at the theatre. The location data can also be used to determine that a user is filming a fight of a wrestling match in an arena or filming a street fight.

In addition, information from the user's social media page can analyze the text, video, images to determine the user's likes/dislikes. This information can be leveraged to increase the confidence level that a user is filming a particular activity. The cognitive processing of social media profiles includes determining the activities present on a user social media profile. In addition, image analysis, pattern recognition, text and sentiment analysis to determine data such as age, gender, preferences, like/dislikes, etc. Also, user entered preferences on preferred activities can be used to determine the user's sensitivities for extreme scenarios and activities. Externally available information includes local laws, restricted areas, public parks, restaurants businesses, and the like can be obtained and used in determining whether the content places the user in any harm.

In one or more embodiments of the invention, a user can be prompted to redirect the live stream data from a first channel based on the activity and the contextual data. A prompt is provided to the user on the user device. The prompt can include options for the user to redirect the live stream to another channel or the user has the option to ignore the prompt. In one or more embodiments of the invention, the user can select a different contact to redirect the live feed. The system 400 can be configured to automatically connect the "in case of emergency" (ICE) contact with the user based at least in part on the emergency situation and the predetermined ICE contacts of the user. In another embodiment, users can opt-in to the live video anomaly detection system described herein, and the redirection can be performed automatically without providing a prompt to the user. For example, in the event the user is streaming and detecting an emergency situation, the channel redirection can be automatically redirected to a different channel.

The method 700 at block 708 provides redirecting, the live stream from a first channel based on the activity and the contextual data to a different channel and simultaneously maintaining the live stream data on the first channel. In the event the user selects from the prompt to redirect the live stream, the live stream can be transferred to one or more other channels such as a channel for emergency responders, authorities, emergency contact list, guardians, etc. After the live stream is redirected, the user maintains the capability to record the live stream while simultaneously providing a live feed to the other channel.

In one or more embodiments of the invention, the live stream is configured to buffer and transmit a portion of the live stream prior to the user selecting another channel to redirect the live stream. In a non-limiting example, the system 400 can record the previous 30 seconds of video and include the recorded content in the redirected feed.

Figure 8:
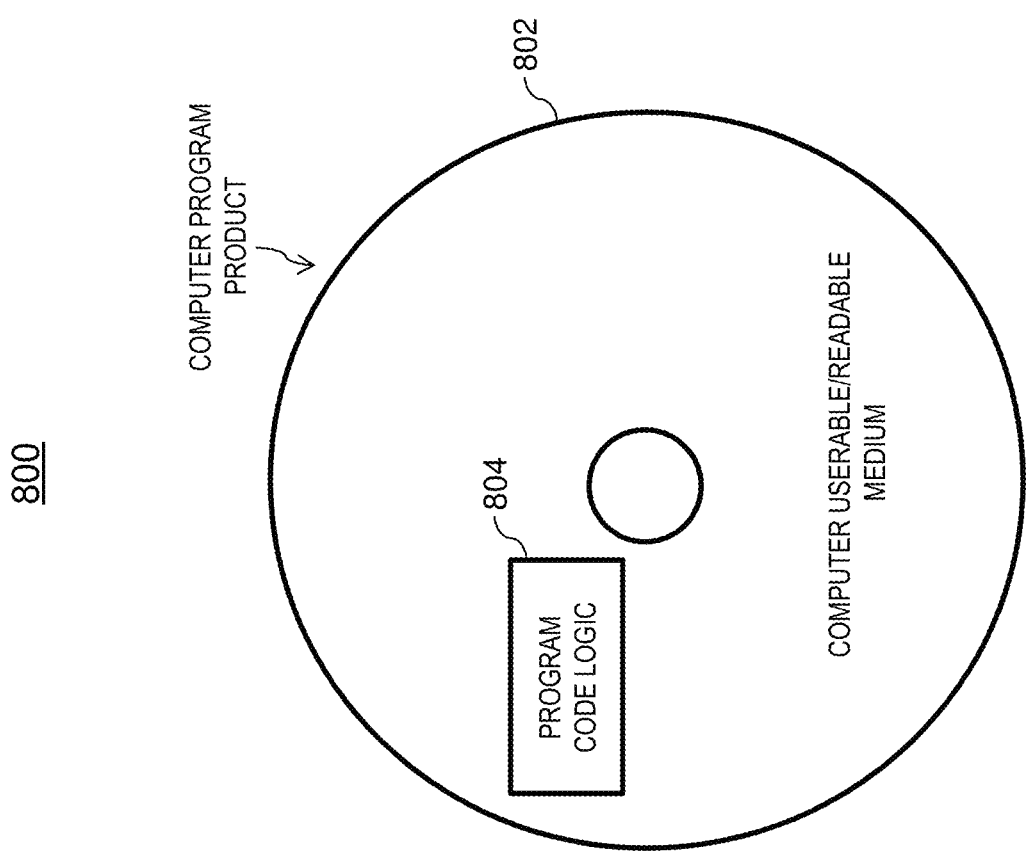
FIG. 8 depicts a computer program product 800 in accordance with an embodiment of the invention.

FIG. 8 depicts a computer program product 800 in accordance with an embodiment that includes a computer readable storage medium 802 and program instructions 804 is generally shown.

The techniques described herein provide improvements over the prior art by allowing a live stream feed to continue while having the capability to simultaneously transfer the live stream to another appropriate channel. In addition, the techniques include real-time analysis of the live stream feed, contextual information, and respective user profiles to prompt users to redirect the live stream feed.

The technology described herein can be applied to other live stream applications such as closed caption TVs, body cameras, and the like. Also, this technology can be applied to Internet of Things (IoT) mesh networks or other devices to enhance a confidence level or tolerance level in the surrounding events by the devices within proximity to the user device providing the live feed wherein the proximity can be detect by a wireless signal strength or a shared network address of an access point or other techniques. The technology can be configured to automatically connect the "in case of emergency" (ICE) contact with the user based at least in part on the emergency situation.

The technical benefits and effects of the invention include anomaly detection within a live stream and a technique to intuitively select additional channels to transfer the live stream factoring in contextual information and user specific sensitivities/preferences.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for live video anomaly detection, comprising:
   detecting live stream data recorded using an image capturing device of a user device;
   determining an activity from the live stream data;
   receiving contextual data associated with the live stream data, wherein the contextual data comprises location data, crowd sourced data, historical data, and time data;
   automatically redirecting the live stream data recorded using the image capturing device of the user device from a first channel, based on detecting an anomaly in the activity and the contextual data, to a different unrelated external channel and simultaneously maintaining the live stream data on the first channel; and
   determining a tolerance level for the activity based at least in part on a user profile for a user recording the live stream data and providing a prompt to the user device recording the live stream data to redirect the live stream data based on the contextual data and comparing the activity to the tolerance level, wherein the contextual data further comprises facial expression data.

2. The computer-implemented method of claim 1, further comprises prompting a user to redirect the live stream data from the first channel, wherein the prompt includes an option to record the live stream data, an option to redirect the live stream data to a different channel, or an option to ignore the redirection.

3. The computer-implemented method of claim 1, wherein a previously recorded portion of the live stream data is included in the redirection.

4. The computer-implemented method of claim 1, further comprises selecting a redirection channel based at least in part on the activity.

5. The computer-implemented method of claim 4, wherein the redirection channel is based on a frequent contact list of a user device.

6. The computer-implemented method of claim 1, wherein the tolerance level is based on social media information for a user.

7. The computer-implemented method of claim 1, wherein additional contextual information is collected from devices external to a recording device collecting the live stream data including performing facial recognition of the live stream data.

8. A system for live video anomaly detection, comprising:
   one or more processors; and
   at least one memory, the memory including instructions that, upon execution by at least one of the one or more processors, cause the system to perform a method for analyzing and prioritizing incoming user messages, the method comprising:
   detecting live stream data recorded using an image capturing device of a user device;
   determining an activity from the live stream data;

receiving contextual data associated with the live stream data, wherein the contextual data includes location data, crowd sourced data, historical data, and time data; and automatically redirecting the live stream data recorded using the image capturing device of the user device from a first channel, based on detecting an anomaly in the activity and the contextual data, to a different unrelated external channel and simultaneously maintaining the live stream data on the first channel; and determining a tolerance level for an activity based at least in part on a user profile for a user recording the live stream data and providing a prompt to the user device recording the live stream data to redirect the live stream data based on the contextual data and comparing the activity to the tolerance level, wherein the tolerance level is based on social media information for a user.

9. The system of claim 8, further comprises prompting a user to redirect the live stream data from the first channel, wherein the prompt includes an option to record the live stream data, an option to redirect the live stream data a different channel, or an option to ignore the redirection.

10. The system of claim 8, wherein a previously recorded portion of the live stream data is included in the redirection.

11. The system of claim 8, further comprises selecting a redirection channel based at least in part on the activity.

12. A computer program product for live video anomaly detection, the computer program product comprising:

a computer readable storage medium having stored thereon program instructions executable by a processor to cause the processor to:

detecting live stream data recorded using an image capturing device of a user device;

determining an activity from the live stream data;

receiving contextual data associated with the live stream data, wherein the contextual data includes location data, crowd sourced data, historical data, and time data;

automatically redirecting the live stream data recorded using the image capturing device of the user device from a first channel, based on detecting an anomaly in the activity and the contextual data, to a different unrelated external channel and simultaneously maintaining the live stream data on the first channel; and determine a tolerance level for an activity based at least in part on a user profile for a user recording the live stream data and providing a prompt to the user device recording the live stream data to redirect the live stream data based on the contextual data and comparing the activity to the tolerance level, wherein the tolerance level is based on a social media information for the user.

13. The computer program product of claim 12, further comprises prompting a user to redirect the live stream data from the first channel, wherein the prompt includes an option to record the live stream data, an option to redirect the live stream data to a different channel, or an option to ignore the redirection.

14. The computer program product of claim 12, wherein a previously recorded portion of the live stream data is included in the redirection.

* * * * *